United States Patent Office 3,298,193
Patented Jan. 17, 1967

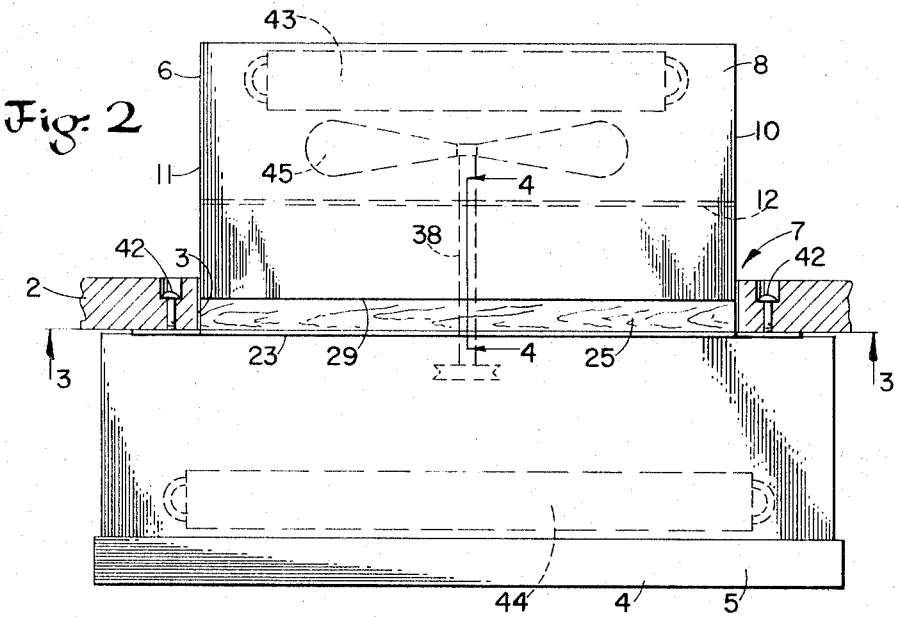

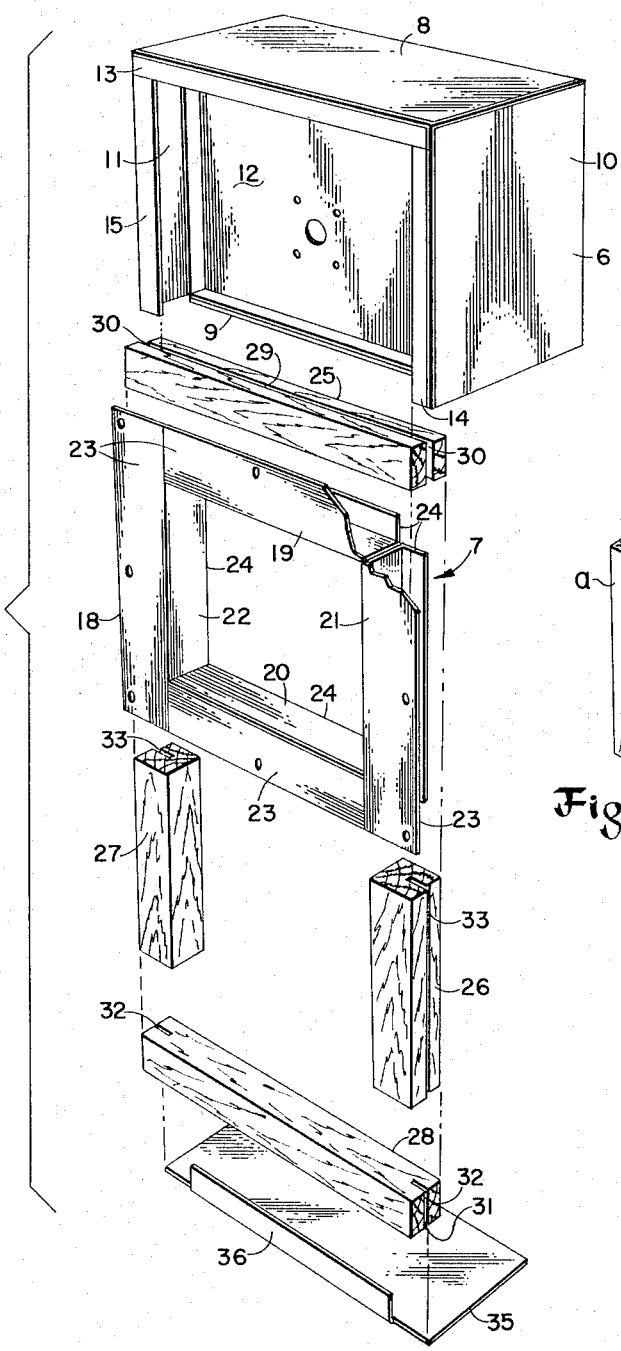

3,298,193
REFRIGERATION UNIT
Clifford N. Johnsen, La Crosse, Wis., assignor to The Trane Company, La Crosse, Wis., a corporation of Wisconsin
Filed Jan. 17, 1966, Ser. No. 521,041
14 Claims. (Cl. 62—244)

This invention relates to the art of refrigeration and particularly to refrigeration units used to refrigerate vehicular enclosures such as commonly installed on the forward wall of refrigerated truck bodies.

More specifically this invention relates to refrigeration units having a condenser section disposed externally of the vehicular enclosure and an evaporator section extending into the vehicular enclosure and structurally connected to and thermally isolated from the condenser section.

In prior art refrigeration units of the above mentioned type, it is common practice to provide a rectangular wood frame interposed between the condenser and evaporator sections. The condenser section is bolted to one side of the wood frame with a first set of bolts while the evaporator section is bolted to the other side of the wood frame with a separate set of bolts. Because two separate sets of bolts are employed, the evaporator and condenser sections are thermally isolated via the wood frame. While this construction provide an efficient thermal isolation between the relatively hot condenser section and the relatively cold evaporator section, it does not provide an ideal mechanical connection between the evaporator and condenser sections. It must be appreciated that the connection between the evaporator and condenser is subjected to substantial vibration both from the engine drive in the condenser section and from the vehicle while in motion. In the prior art construction described, the wood frame has points of maximum shear and bending stress coincident with the individual connecting bolts and vibration can cause extensive wear or even fracture at the bolt holes thereof and ultimate failure. Furthermore, this construction employed in the prior art tends to be costly and overly complicated because of the large number of bolts which must be individually inserted and tightened in each unit.

It is therefore an object of the instant invention to provide a refrigeration unit which overcomes the above indicated deficiencies and inadequacies of the prior art.

It is a further object of this invention to provide a refrigeration unit with structure for connecting and thermally isolating the condenser and evaporator section wherein the isolating members are placed under only a minimum of bending and shear stress.

It is another object of this invention to provide a refrigeration unit for use with vehicular enclosures which maintains the evaporator and condenser in rigid thermally isolated relationship despite exposure to extended periods of vibration.

Further, it is an object of this invention to provide a refrigeration unit for cooling vehicle enclosures which is low in cost and simple and inexpensive to assemble.

Other objects and advantages will become apparent as this specification proceeds to describe the invention with reference to the accompanying drawing wherein like elements have been assigned like reference numerals in which:

FIGURE 1 illustrates a truck having a vehicular enclosure provided with a refrigeration unit incorporating the invention;

FIGURE 2 is a section through the forward wall of the vehicular enclosure of FIGURE 1 showing a plan view of the refrigeration unit;

FIGURE 3 is a vertical section taken at line 3—3 of FIGURE 2;

FIGURE 4 is a vertical section taken at line 4—4 of FIGURE 2 rotated clockwise 90°;

FIGURE 5 is a perspective view of a portion of the refrigeration unit shown in FIGURE 1 wherein the parts shown have been exploded only in the vertical direction; and FIGURE 6 is a two-piece modification of the thermal isolator blocks shown in FIGURE 5.

Truck 1 has a refrigerated body having a front wall 2 with a rectangular aperture 3 therein for receiving and mounting a mechanical refrigeration unit 4.

Refrigeration unit 4 includes a condenser section 5 which externally overlies aperture 3 in wall 2 and has a condenser coil 44 disposed therein. Unit 4 also has an evaporator section 6 which overlies aperture 3 internally of wall 2. Condenser section 5 and evaporator section 6 are connected together and to wall 2 by mounting means 7.

The housing of evaporator section 6 includes a rectangular top panel 8, a rectangular bottom panel 9 and spaced parallel vertical side panels 10 and 11 each formed from metallic plate. Evaporator section 6 further includes a bulkhead 12 which is perpendicular to and circumscribed by the aforementioned panels. Top panel 8 has at the forward edge thereof a downwardly extending flange 13 and the forward edge of side panels 10 and 11 have inwardly extending flanges 14 and 15 respectively. Flanges 13, 14 and 15 are for the purpose of securing the evaporator section 6 to condenser section 5 and to front wall 2 of the truck 1 as hereinafter described. A refrigerant evaporator 43 and an evaporator fan 45 are disposed within the evaporator housing rearwardly of bulkhead 12.

The housing of condenser section 5 is generally rectangular and includes a back wall 16 formed of metallic plate. The condenser section includes a condenser heat exchanger 44, a compressor (not shown), a condenser fan (not shown), and an internal combustion engine (not shown) for driving the compressor and condenser and evaporator fans. The condenser, evaporator, and compressor are respectively serially connected by refrigerant lines (not shown) in a closed refrigerant circuit.

Connecting means 7 includes a rectangular frame 18 comprising top U-shaped channel 19, bottom U-shaped channel 20, and side U-shaped channels 21 and 22. Channels 19, 22, 20 and 21 are respectively joined end-to-end at their web portions. Each channel has a relatively long outwardly extending forward leg or flange 23 and a relatively short outwardly extending rear leg or flange 24.

Connecting means 7 further includes an elongated horizontally extending top thermal isolator hardwood rectangular block 25, a pair of elongated vertically extending side thermal isolator hardwood rectangular blocks 26 and 27, and an elongated horizontally extending bottom thermal isolator hardwood rectangular block 28. If desired, any one or all of blocks 25, 26, 27 and 28 may be formed from two separate thermal isolator members *a* and *b* as illustrated in FIGURE 6 or may be integral as those shown in FIGURE 5.

Block 25 has a longitudinally extending groove 29 in the top face thereof and a vertically extending groove 30 in each end thereof. Block 28 has a longitudinally extending groove 31 in the bottom face thereof and a vertically extending groove 32 in each end thereof. Blocks 26 and 27 each have a longitudinally extending groove 33 on the laterally outer face thereof.

Connecting means 7 also includes a retainer plate 35 having an upwardly extending flange 36 along the forward edge thereof.

Connection of the refrigeration unit housings is as follows. The front face of frame 18 formed by legs 23 is first welded flush or otherwise fastened to the back wall 16 of the condenser section 5 as indicated at 37. Top block 25 is positioned within the bight of top channel 19 oriented with groove 29 facing upwardly. Flanges 14 and 15 of the housing of the evaporator section 6 are aligned with grooves 30 and the evaporator section housing is lowered relative to block 25 until flange 13 comes to rest in groove 29 of block 25. Blocks 26 and 27 are inserted upwardly to block 25 between the bight of channels 21 and 22 and evaporator housing side panels 10 and 11 respectively while grooves 33 receive flanges 14 and 15. The bottom block 28 is then placed within the bight of bottom channel 20 while the grooves 32 receive flanges 14 and 15. Block 28 abuts the lower ends of side blocks 26 and 27 and retains these side blocks in position. Block 28 is retained in position by installation of retainer plate 35 with flange 36 received in groove 31. Plate 35 is then welded or otherwise fastened to the bottom panel 9 of the evaporator housing.

In the event the fan in the evaporator section is to be mechanically driven by the engine in the condenser section, a drive shaft 38 may be extended through the condenser section back wall 16 and through the evaporator section bulkhead 12 and drivingly connected to evaporator fan 45. Appropriate bearings 39 and 40 may be connected to wall 16 and bulkhead 12 for rotatably supporting shaft 38. Also the refrigerant lines (not shown), to and from the evaporator may extend through wall 16 and bulkhead 12.

Subsequently the void between wall 16 and bulkhead 12 is filled with polyurethane foam insulation 41 after which the refrigeration unit may be installed on the front wall 2 of truck 1 and secured in position as by bolts 42 which extend through front wall 2, longer legs 23 of frame 18 and back wall 16 of the condenser section. The polyurethane foam insulation bonds to the condenser wall 16, bulkhead 12, rectangular frame 18 and parts of the hardwood blocks 25, 26, 27 and 28 thereby bonding together all these parts to define a very strong and rigid union between the condenser and evaporator sections.

It will thus be seen that my novel refrigeration unit herein described affords a strong, rigid, and durable joint between the evaporator and condenser sections thereof while providing a maximum of thermal isolation between the relatively warm condenser section and the relatively cold evaporator section. This connecting means is extremely low in cost, simple to assemble and efficient in operation.

Having thus described in detail the preferred embodiment of my invention, I contemplate that many changes may be made without departing from the scope or spirit of my invention and I desire to be limited only by the claims.

I claim:

1. A refrigeration unit for refrigerating a vehicular enclosure comprising a condenser section having a wall; a refrigerant condenser disposed within said condenser section; an evaporator section disposed in juxtaposition with said wall; a refrigerant evaporator disposed in said evaporator section; a first elongated thermal isolator member extending generally parallel to said wall; a first elongated flange connected to said evaporator section and abutting along an elongated surface of said thermal isolator member facing toward said condenser section; and a second elongated flange connected to said condenser section and abutting along an elongated surface of said thermal isolator member facing away from said condenser section thereby connecting said condenser and evaporator sections in rigid thermally isolated relationship.

2. The apparatus as defined by claim 1 wherein a second elongated thermal isolator member is contiguously interposed between a surface connected to one of said sections and one of said flanges.

3. The apparatus as defined by claim 2 wherein said first and second elongated isolator members are integral and said one flange is disposed within a groove in said integral member.

4. The apparatus as defined by claim 3 wherein said surface connected to one of said sections is defined by a first leg of a U-shaped channel member and said one flange is defined by the second leg of said channel member.

5. The apparatus as defined by claim 4 wherein said first leg is longer than said second leg and is secured to said wall and said enclosure.

6. The apparatus as defined by claim 1 wherein at least portions of each of said first and second flanges are in alignment in a direction normal to said wall.

7. A refrigeration unit for refrigerating a vehicular enclosure comprising a condenser section having a wall; a refrigerant condenser disposed within said condenser section; an evaporator section disposed in juxtaposition with said wall of said condenser section; a refrigerant evaporator disposed within said evaporator section, a rectangular frame in which each span thereof is defined by a U-shaped channel-like member with the legs thereof extending outwardly from the center of said frame; means connecting one side of said frame to said wall; a thermal isolator block disposed within the bight of each of said channel-like members, each of said blocks having a groove on the surfaces thereof facing away from the channel member in which it is disposed; a plurality of flanges connected to said evaporator section and received in the grooves of said isolator blocks thereby connecting said condenser and evaporator sections in rigid thermally isolated relationship.

8. A refrigeration unit for refrigerating a vehicular enclosure comprising a condenser section having a vertical back wall; a refrigerant condenser disposed within said condenser section; a rectangular frame having an upper and a lower horizontal span and two vertical side spans; each of said spans being defined by a U-shaped channel member having the legs thereof extending outwardly from said frame; means connecting one side of said frame to said wall; an isolator block disposed within the bight of each of said channel members and each having a groove on the surface facing away from the channel member in which it is disposed; an evaporator section having a rectangular housing disposed in juxtaposition with said wall and having a top horizontal panel, two vertical side panels and a bottom horizontal panel; a refrigerant evaporator disposed within said evaporator section; the forward edge of said top panel having a downwardly extending flange received in the groove of said isolator block disposed in the upper horizontal span of said frame; the forward edge of said side panels each having a flange extending inwardly toward said frame and received in the grooves of said isolator block disposed in the bight of each of the vertical spans of said frame; a horizontal retainer plate having on the forward edge thereof an upwardly extending flange received within the groove of said isolator block disposed in the bight of the lower horizontal span of said frame thereby connecting said condenser and evaporator sections in rigid thermally isolated relationship.

9. A refrigeration unit for refrigerating a vehicular enclosure comprising a condenser section having a wall; a refrigerant condenser disposed within said condenser section; an evaporator section disposed in juxtaposition with said wall; a refrigerant evaporator disposed within said evaporator section; a first elongated thermal isolator member disposed between said sections and having a longitudinal axis extending generally parallel to said wall; a second elongated thermal isolator member disposed between said sections and having a longitudinal axis extending generally parallel to and spaced from the longitudinal axis of said first member; a third elongated thermal isolator member disposed between said sections and generally between the longitudinal axes of said first and second members and having a longitudinal axis extending generally parallel to said wall and generally normal to said first and second members; a fourth elongated thermal isolator member disposed between said sections and generally between the longitudinal axes of said first and second members and having a longitudinal axis extending generally parallel to and spaced from the longitudinal axis of said third member; said first and second members extending generally between the longitudinal axes of said third and fourth members; each of said isolator members having a first elongated surface facing toward said condenser section and a second elongated surface facing away from said condenser section; each of said first elongated surfaces having a first elongated flange abutting therealong and connected to said evaporator section; each of said second surfaces having a second flange abutting therealong and connected to said condenser section thereby connecting said condenser and evaporator sections in rigid thermally isolated relationship.

10. The apparatus as defined by claim 9 wherein there is disposed adjacent each of said elongated isolator members another isolator member contiguously interposed between a surface connected to one of said sections and one of said first and second flanges.

11. The apparatus as defined by claim 10 wherein each of said elongated isolator members is integral with the elongated isolator member on the opposite side of said one flange and said one flange is disposed within a groove in said integral member.

12. The apparatus as defined by claim 9 wherein at least portions of each of said first and second flanges at each isolator member are in alignment in a direction normal to said wall.

13. The apparatus as defined by claim 9 wherein said evaporator section includes a bulkhead and the void between said bulkhead and said wall is filled with polyurethane foam thereby rigidly bonding together said bulkhead and said wall.

14. The apparatus as defined by claim 13 wherein said evaporator section contains a fan and a shaft for driving said fan extends through said wall and said bulkhead.

References Cited by the Examiner

UNITED STATES PATENTS

| 2,475,841 | 7/1949 | Jones | 62—450 X |
| 2,735,277 | 2/1856 | Clark | 62—450 X |
| 2,809,812 | 10/1957 | Erickson et al. | 62—450 X |

LLOYD L. KING, *Primary Examiner.*